United States Patent
Kujawa et al.

(10) Patent No.: US 6,988,484 B1
(45) Date of Patent: Jan. 24, 2006

(54) FUEL FILL BASED SPARK KNOCK CONTROL

(75) Inventors: David J Kujawa, White Lake, MI (US); Ken Hardman, Clarkston, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/978,630

(22) Filed: Nov. 1, 2004

(51) Int. Cl.
*F02P 5/152* (2006.01)

(52) U.S. Cl. .............................. 123/406.3; 123/406.29

(58) Field of Classification Search .......... 123/406.21, 123/406.29, 406.3, 406.32, 406.33; 73/35.02
See application file for complete search history.

(56) References Cited

U.S. PATENT DOCUMENTS 4,459,808 A * 7/1984 Rydquist et al. .............. 60/602
4,708,113 A * 11/1987 Harada et al. ........... 123/406.3

FOREIGN PATENT DOCUMENTS

JP 61-197744 A * 9/1986

* cited by examiner

*Primary Examiner*—Tony M. Argenbright
(74) *Attorney, Agent, or Firm*—Ralph E. Smith

(57) ABSTRACT

A method for reducing the magnitude of a knock retard angle in a vehicle having a quantity of fuel and a system for determining the quantity of fuel. The method determines a previous fuel quantity and a present fuel quantity, determines from said present fuel quantity and said previous fuel quantity whether the quantity of fuel has increased; and decreases the magnitude of the knock retard angle upon determining the quantity of fuel has increased.

7 Claims, 1 Drawing Sheet

FUEL FILL BASED SPARK KNOCK CONTROL

FIELD OF THE INVENTION

The present invention relates generally to a method of determining spark delivery angle in an internal combustion engine, and more particularly to such a method wherein the quality of fuel being delivered to the engine is subject to change when fuel is replenished.

BACKGROUND OF THE INVENTION

Modern spark ignited (SI) internal combustion engines are often equipped with a knock sensor for detecting spark knock. Upon detection of knock, which may be caused by poor quality fuel, an engine control system retards the angle of spark delivery to the engine. The amount of retard, which may be referred to as knock retard, may then be decremented after a predetermined amount of time. If the variable, such as poor quality fuel, which caused the spark knock has passed through the engine or otherwise dissipated, then the engine will continue to operate without knocking at the advanced spark angle.

While such a system provides protection from spark knock, the engine may operate with knock retard for an undesirable amount of time, even when the variable, such as poor quality gas, has long passed through the engine.

SUMMARY OF THE INVENTION

To address the described shortcoming in the art, a method is provided for reducing the magnitude of a knock retard angle in a vehicle having a quantity of fuel and a system for determining the quantity of fuel. The method determines a previous fuel quantity and a present fuel quantity, determines from said present fuel quantity and said previous fuel quantity whether the quantity of fuel has increased; and decreases the magnitude of the knock retard angle upon determining the quantity of fuel has increased.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
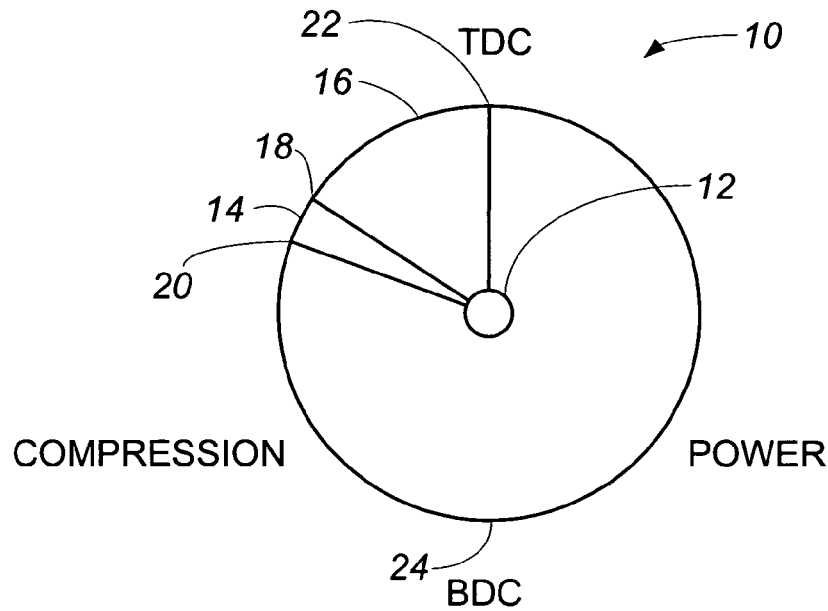
FIG. 1 depicts crankshaft angles during the compression and power strokes of an SI internal combustion engine.

Turning to FIG. 1, an end view of a crankshaft 12 in a spark ignited internal combustion engine (SIIC) is depicted. Such engines are well known in the art. An outer circle 16 represents 360 degrees of crankshaft 12 rotation in the clockwise direction. The top of outer circle 16 is marked TDC to indicate Top Dead Center of the compression stroke of a given cylinder as is known in the art. Similarly, the bottom of outer circle 10 is marked BDC to indicate Bottom Dead Center of the given cylinder's power stroke as is known in the art.

A line segment indicates a base spark angle 20, which represents the angle of crankshaft 12 rotation at which a spark would be delivered, absent knock retard angle 14, to the engine cylinder which is approaching TDC 22. The total spark angle is represented by line segment 18, and is calculated by subtracting the knock retard angle 14 from the base spark angle 20. The base spark angle and total spark angle are measured with respect to TDC 22, and are expressed as a number of degrees Before Top Dead Center (BTDC).

The knock retard angle 14 varies over time. During operation of the engine, the knock retard angle is increased by an engine control unit when it detects engine knock via a knock sensing arrangement as is know in the art. Fuel octane is an engine operating variable that can cause engine knock, and therefore it is known for an engine controller to increase the knock retard angle upon detecting knock, and decreasing the knock retard angle after a predetermined amount of time. In the instant invention, the knock retard angle is decreased after the fuel supply is replenished, thereby reducing the possibility of reducing the knock retard angle while poor quality fuel is being supplied to the engine.

Figure 2:
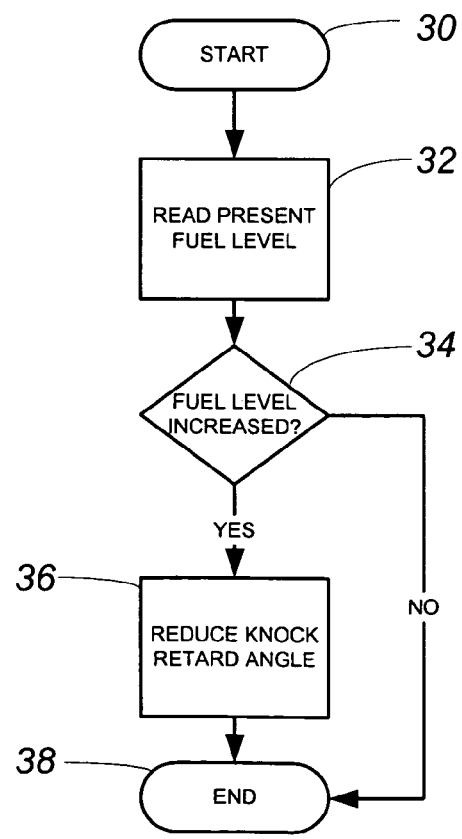
FIG. 2 depicts a method for adjusting knock retard.

Turning now to FIG. 2, the method of decreasing the knock retard angle is shown. In a preferred embodiment, the method is executed by an engine control unit having access to a fuel level signal and a non-volatile memory. The fuel level signal is representative of the quantity of fuel in the storage tank supplying the engine. The non-volatile memory stores the fuel level information while the engine is shut off.

The method may be executed periodically, such as once per minute, or several minutes, allowing it to determine whether fresh fuel has been added to the tank while the engine is running. Alternatively, the method may be executed once each time the engine is run, with the single execution taking place earlier, rather than later, in the engine run cycle. The run cycle includes the period when the engine controller has been turned on, but the engine has not yet started.

The method begins at block 30 and proceeds to block 32 where it reads the present level of fuel in the storage tank. The method then proceeds to decision block 34 and determines whether the fuel level has increased since the previous determination of the fuel level. In a preferred embodiment, the fuel level must increase by more than a predetermined amount to reduce the effects of fuel sloshing and other measurement errors inherent in the control unit and fuel level signal. If the method is executed periodically, then the previous determination would have occurred during the previous execution of the method, such as one minute prior to the present execution. In the alternate embodiment, where the method is execute once per run cycle, then the previous determination of fuel level would have taken place during the previous run cycle and stored in the non-volatile memory of the controller. If the method determines that the fuel level has not increased, then the method proceeds to block 38 and terminates without reducing the magnitude of knock retard.

Returning to decision block 34, if the method determines that the fuel level has increased then it proceeds to block 36 and reduces the magnitude of knock retard by a predetermined amount. The knock retard is reduced under a presumption that the quality of the added fuel may be of better quality (e.g. higher octane) than the fuel which was in the tank prior to the storage tank being refilled. The knock retard may be reduced by a predetermined amount in a simple embodiment; however the knock retard angle should not be reduced to less than zero. Reducing the knock retard angle 14 to less than zero would cause the total spark angle 18 to be greater than the base spark angle 20, thereby undesirably causing the engine to knock once again.

In alternative embodiments, which are not mutually exclusive, the method, at block 36, may reduce the knock retard by a percentage. The method may also delay reducing the knock retard for a predetermined amount of time, which would allow the new fuel blend in the fuel tank to propagate to the engine.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for reducing the magnitude of a knock retard angle in a vehicle having a quantity of fuel and a system for determining the quantity of fuel, the method comprising:
   determining a previous fuel quantity;
   determining a present fuel quantity, determining from said present fuel quantity and said previous fuel quantity whether the quantity of fuel has increased; and
   decreasing the magnitude of the knock retard angle upon determining the quantity of fuel has increased.

2. The method of claim 1 wherein said step of determining from said present fuel quantity and said previous fuel quantity whether the quantity of fuel has increased includes calculating the difference between said present fuel quantity and said previous fuel quantity.

3. The method of claim 1 wherein said step of decreasing the magnitude of the knock retard angle upon determining the quantity of fuel has increased further requires that said quantity of fuel has increased by greater than a predetermined amount.

4. The method of claim 1 wherein said step of decreasing the magnitude of the knock retard angle upon determining the quantity of fuel has increased further requires decreasing the magnitude of the knock retard angle by a predetermined decrement amount.

5. The method of claim 4 further comprising the steps of determining a base spark angle and limiting the magnitude of said predetermined decrement amount such that a total spark angle is less than or equal to said base spark angle.

6. The method of claim 4 wherein said predetermined decrement amount is a percentage.

7. The method of claim 1 wherein said step of decreasing the magnitude of the knock retard angle upon determining the quantity of fuel has increased occurs a predetermined amount of time after said determination that said quantity of fuel has increased.

\* \* \* \* \*